Patented July 14, 1931

1,814,208

UNITED STATES PATENT OFFICE

EDUARD DÖRR AND OTTO LEUCHS, OF ELBERFELD, AND LEO ROSENTHAL, OF VOH-WINKEL, NEAR ELBERFELD, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS OF PURIFYING CELLULOSE ETHERS

No Drawing. Application filed May 20, 1929, Serial No. 364,691, and in Germany March 31, 1927.

The present invention relates to a process of purifying cellulose ethers, more particularly it relates to a process of purifying ethoxycellulose, containing about 42–48% of ethoxy groups.

Up to the present time ethyl cellulose has been purified by dissolving the ethylcellulose in the cold in an appropriate solvent and precipitating the ethylcellulose from its solution by the addition of a precipitant.

According to the present invention, ethoxycellulose with an ethoxy content of about 42–48% is purified by dissolving said cellulose ethers in such an organic solvent as dissolves the cellulose ether only by heating but which does not dissolve said cellulose ethers in the cold. The ethylcellulose is dissolved by heating in the solvent as identified above, advantageously by refluxing the ethyl cellulose, then the solution is filtered from some impurities eventually present in the crude ethyl cellulose, and then the solution is cooled, whereby the pure ethylcellulose separates. The temperature at which the separation of the cellulose begins somewhat depends on the concentration, but at about 20° C. the separation is complete. That part of the crude ethylcellulose which does not separate from the solution essentially consists of technically valuable substances, for example of ethylcelluloses which have been decomposed to a high degree. The ethylcellulose is dried, generally in a vacuo and is obtained in form of a fine, flaky, pure white product which dissolves smoothly in the customary solvents.

Suitable solvents for the purpose of our invention are benzene, aliphatic and hydroaromatic hydrocarbons, having a boiling point of about at least 80° C., such as ligroin, hydrotoluene, cyclohexane or mixtures of these hydrocarbons, for example mixtures of the hydroaromatic hydrocarbons known by the trade-names "Bornylan" and "Sangajol", said mixtures being obtained from Borneo earth oil and having a boiling point from 130–154° C. and 160–170° C. respectively.

The specific solvent used for the purpose of the invention depends on the ethoxy content of the cellulose. Thus for the lower ethylated celluloses in the above identified range, say for celluloses with an ethoxy content of 42–45%, there is benzene a suitable solvent, while for the higher ethylated celluloses, say with an ethoxy content of 46–48%, the above mentioned aliphatic and hydroaromatic hydrocarbons come into consideration.

There may be used of course mixtures of benzene and aliphatic or hydroaromatic hydrocarbons but care must be taken that the specific mixture used is adapted to the ethylcellulose to be purified, that means, the higher there is the ethoxy content the higher must be the ratio of the aliphatic or hydroaromatic hydrocarbon in the mixture.

The invention is illustrated by the following examples, but is not restricted thereto:

*Example 1.*—2 kgs. of ethyl celluose containing 46% of ethoxy groups are dissolved in 40 kgs. of ligroin, boiling at 110° C. (or in Bornylan) at 80–90° C., filtered hot, if necessary, through a filter press and then cooled to room temperature in a stirring vessel with thorough stirring. The ethyl cellulose is precipitated as a fine flaky product. After drying it is obtained as a fine, flaky very spongy, pure white product, which dissolves smoothly in the customary solvents to give completely homogeneous solutions.

*Example 2.*—Ethylcellulose with an ethoxy content of about 42% is dissolved in 20 to 25 times its weight of benzene at 80° C. The solution is filtered hot and then cooled to room temperature in a stirring vessel with thorough stirring. The ethyl cellulose is filtered and dried in a vacuo.

*Example 3.*—2 kgs. of ethylcellulose having an ethoxy content of 44% are dissolved in 40 kgs. of a mixture consisting of 1 part of benzene and 1 part of Bornylan at 80–90° C. and filtered while hot. The further working is effected as described in Example 1.

This is a continuation in part of our application Ser. No. 260,240, filed March 8, 1928.

We claim:

1. The process of purifying ethyl cellulose with an ethoxy content of 42–48% which process comprises dissolving an ethoxy cellulose with an ethoxy content of 42-48% in a hydrocarbon of the group consisting of benzene, of aliphatic and hydroaromatic hydrocarbons having a boiling point of at least 80° C. at elevated temperature, cooling the solution and separating the ethyl cellulose.

2. The process of purifying ethyl cellulose with an ethoxy content of 42-48% which process comprises dissolving an ethoxy cellulose with an ethoxy content of 42-48% in a hydrocarbon of the group consisting of benzene, of aliphatic and hydroaromatic hydrocarbons having a boiling point of at least 80° C. at a temperature of about 80° C., cooling the solution and separating the ethyl cellulose.

3. The process of purifying ethyl cellulose with an ethoxy content of about 45-48% which process comprises dissolving the ethoxy cellulose with an ethoxy content of 45-48% in ligroin while boiling, cooling the solution and separating the ethyl cellulose.

4. The process of purifying ethyl cellulose with an ethoxy content of 42-48% which process comprises dissolving an ethoxy cellulose with an ethoxy content of 42-48% in a hydrocarbon of the group consisting of benzene, of aliphatic and hydroaromatic hydrocarbons having a boiling point of at least 80° C. at elevated temperature, cooling the solution to about 20° C. and separating the ethyl cellulose.

5. The process of purifying ethyl cellulose with an ethoxy content of 42-48% which process comprises dissolving an ethoxy cellulose with an ethoxy content of 42-48% in a hydrocarbon of the group consisting of benzene, of aliphatic and hydroaromatic hydrocarbons having a boiling point of at least 80° C. at a temperature of about 80° C., cooling the solution to about 20° C. and separating the ethyl cellulose.

6. The process of purifying ethyl cellulose with an ethoxy content of about 45-48% which process comprises dissolving the ethoxy cellulose with an ethoxy content of 45-48% in ligroin while boiling, cooling the solution to about 20° C. and separating the ethyl cellulose.

In testimony whereof, we hereunto set our hands and affix our seals.

EDUARD DÖRR. [L. S.]
OTTO LEUCHS. [L. S.]
LEO ROSENTHAL. [L. S.]